(12) United States Patent
 Savian

(10) Patent No.: US 11,062,406 B2
(45) Date of Patent: Jul. 13, 2021

(54) BAGGAGE MANAGEMENT AND RESERVATION SYSTEM

(71) Applicant: SAFRAN CABIN INC., Huntington Beach, CA (US)

(72) Inventor: Scott Savian, Huntington Beach, CA (US)

(73) Assignee: SAFRAN CABIN INC., Huntington Beach, CA (US)

( * ) Notice: Subject to any disclaimer, the term of this patent is extended or adjusted under 35 U.S.C. 154(b) by 62 days.

(21) Appl. No.: 16/352,001

(22) Filed: Mar. 13, 2019

(65) Prior Publication Data

US 2019/0213698 A1 Jul. 11, 2019

Related U.S. Application Data

(63) Continuation-in-part of application No. 16/024,448, filed on Jun. 29, 2018, now Pat. No. 10,713,617.

(60) Provisional application No. 62/527,899, filed on Jun. 30, 2017, provisional application No. 62/537,373, filed on Jul. 26, 2017.

(51) Int. Cl.
 *G06Q 50/14* (2012.01)
 *G06Q 20/10* (2012.01)
 *G06Q 10/02* (2012.01)

(52) U.S. Cl.
 CPC ............. *G06Q 50/14* (2013.01); *G06Q 10/02* (2013.01); *G06Q 20/10* (2013.01)

(58) Field of Classification Search
 CPC ........ G06Q 50/14; G06Q 20/10; G06Q 10/02; G06Q 30/0633; G06Q 30/06; G07F 9/023; B64D 11/003; B64D 45/0005; B60R 11/00; B60R 11/0028; B60R 5/045; B60R 7/02

USPC .... 40/459, 460, 491, 492, 493, 606.07, 907; 244/118.1, 118.5, 118.6; 700/213–244; 703/1; 705/5; 340/10.1, 10.2, 10.3, 10.4, 340/10.5, 10.6, 568.1, 572.1; 116/86, 116/200, 201, 281, 284, 285
See application file for complete search history.

(56) References Cited

U.S. PATENT DOCUMENTS

| | | | | |
|---|---|---|---|---|
| 6,044,353 | A * | 3/2000 | Pugliese, III | G06Q 10/02 235/375 |
| 7,344,109 | B1 * | 3/2008 | Rezai | B64F 1/322 244/118.2 |
| 8,823,554 | B2 * | 9/2014 | Yourkowski | G06Q 10/00 340/945 |
| 8,947,267 | B2 * | 2/2015 | Riedel | B64D 11/00 340/945 |
| 8,952,813 | B2 * | 2/2015 | Boss | G06Q 10/0832 340/572.1 |
| 9,745,064 | B2 * | 8/2017 | Balasubramanian | B64D 11/003 |
| 9,764,842 | B2 | 9/2017 | Woicekowski | |
| 9,869,574 | B2 * | 1/2018 | Nicks | G01B 21/20 |
| 10,189,406 | B1 * | 1/2019 | Pozzi | B60R 5/003 |

(Continued)

*Primary Examiner* — Andrew Joseph Rudy
(74) *Attorney, Agent, or Firm* — Jeffer Mangels; Butler & Mitchell LLP; Brennan C. Swain, Esq.

(57) ABSTRACT

A system for reserving space in aircraft overhead storage bins. The system includes an aircraft and a reservation system. The aircraft includes at least a first storage bin that defines a first bin interior that is divided into at least first and second baggage sections. The aircraft is associated with a flight date and a flight time. A first passenger can utilize the reservation system to make a first reservation to reserve at least one of the first and second baggage sections prior to the flight date and the flight time.

20 Claims, 9 Drawing Sheets

(56) References Cited

U.S. PATENT DOCUMENTS

| | | | |
|---|---|---|---|
| 10,289,768 B2* | 5/2019 | Lee | G06F 30/20 |
| 10,472,067 B2* | 11/2019 | Breuer | B64D 11/003 |
| 10,494,118 B1* | 12/2019 | Kilcer | G02B 6/0055 |
| 10,562,631 B2* | 2/2020 | Walker | H02J 50/10 |
| 10,669,028 B1* | 6/2020 | Kuyper | B60R 5/003 |
| 2001/0030599 A1 | 10/2001 | Zimmermann et al. | |
| 2004/0021572 A1* | 2/2004 | Schoen | G08B 13/2462 340/572.1 |
| 2006/0277807 A1* | 12/2006 | Wilde | B32B 27/304 40/606.07 |
| 2007/0115123 A1* | 5/2007 | Roberts | G06Q 50/30 340/568.1 |
| 2008/0060910 A1* | 3/2008 | Younkin | B65D 33/02 198/348 |
| 2008/0086464 A1 | 4/2008 | Enga | |
| 2011/0139929 A1 | 6/2011 | Young | |
| 2013/0311213 A1* | 11/2013 | Schmidt | G06Q 10/02 705/5 |
| 2014/0077952 A1 | 3/2014 | Boss | |
| 2014/0126829 A1 | 5/2014 | Seeley et al. | |
| 2015/0241209 A1 | 8/2015 | Jouper et al. | |
| 2016/0109280 A1* | 4/2016 | Tiu | B64D 11/003 702/173 |
| 2017/0152044 A1 | 6/2017 | Balasubramanian | |
| 2017/0283086 A1 | 10/2017 | Garing et al. | |
| 2017/0286578 A1 | 10/2017 | Lee et al. | |
| 2019/0375588 A1* | 12/2019 | Lindbo | B65G 1/0492 |

* cited by examiner

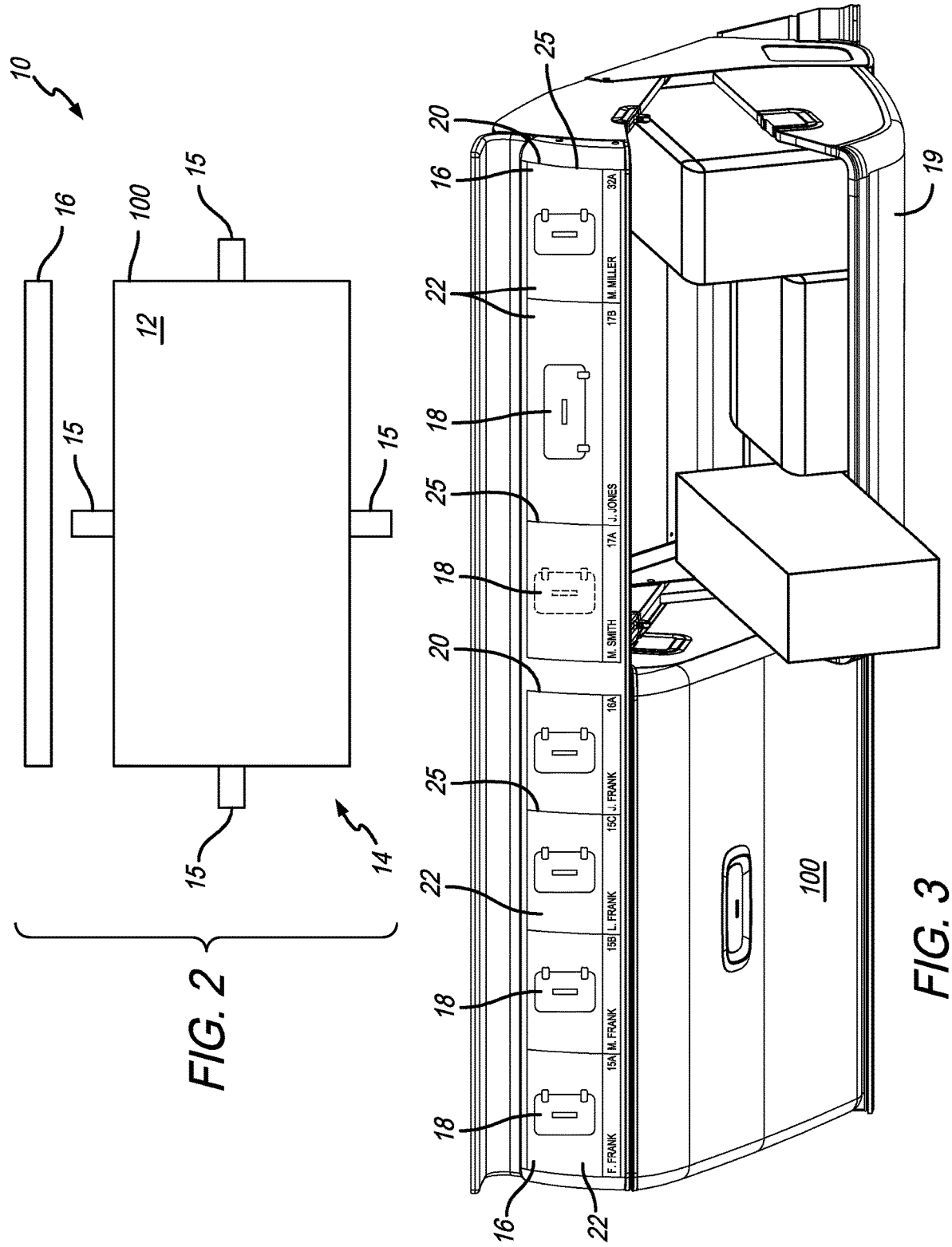

BAGGAGE MANAGEMENT AND RESERVATION SYSTEM

CROSS REFERENCE TO RELATED APPLICATIONS

This application is a continuation-in-part of U.S. patent application Ser. No. 16/024,448, filed Jun. 29, 2018, which claims the benefit of U.S. Provisional Application No. 62/537,373, filed Jul. 26, 2017 and U.S. Provisional Application No. 62/527,899, filed Jun. 30, 2017, the entireties of which are incorporated herein by reference.

FIELD OF THE INVENTION

The present invention relates generally to a baggage management system, and more particularly to baggage management system for use in a commercial aircraft.

BACKGROUND OF THE INVENTION

Baggage loading issues and lack of baggage space are a leading source of passenger and crew frustration, and a top contributor to flight delays and turnaround time variations. On time performance is critical to airlines and passengers, and reducing boarding and unloading times has a direct impact not only on time performance, but the overall performance of an airline. Consistent, short turnaround time (from arriving at the gate from one flight, to departing the gate for the next) can not only improve customer satisfaction and save costs, but can also potentially enable an airline to schedule and achieve additional flights per day, per aircraft. Storage capacity systems are known. For example see U.S. Pat. No. 9,764,842, U.S. Publication No. 2015/0241209, U.S. Publication No. 2001/0030599 and U.S. Publication No. 2016/0109280, the entireties of which are incorporated by reference herein.

SUMMARY OF THE PREFERRED EMBODIMENTS

In accordance with a first aspect of the present invention there is provided a system for reserving space in aircraft overhead storage bins. The system includes an aircraft and a reservation system. The aircraft includes at least a first storage bin that defines a first bin interior that is divided into at least first and second baggage sections. The aircraft is associated with a flight date and a flight time. A first passenger can utilize the reservation system to make a first reservation to reserve at least one of the first and second baggage sections prior to the flight date and the flight time. The system preferably includes a baggage monitoring system associated with the first storage bin that is configured to monitor the positioning of baggage within the first and second baggage sections. In a preferred embodiment, the system also includes a display member associated with the first storage bin that is configured to provide baggage positioning information related to the first reservation. Preferably, the baggage positioning information includes information related to the first passenger, that can include at least one of the first passenger's name or the first passenger's seat number.

In a preferred embodiment, the baggage monitoring system is configured to monitor the orientation of baggage placed in the bin interior and the display member is configured to provide baggage orientation information related to the first reservation. Preferably, the reservation system is configured to accept payment from the first passenger for the first reservation.

In accordance with another aspect of the present invention there is provided a method of loading baggage in a vehicle that includes making a first reservation by reserving a first baggage section in a bin interior of a first storage bin. The first reservation is associated with a first date and a first time. The method also includes positioning a bag in the first baggage section on the first date. Preferably, the first storage bin includes a display member associated therewith, and the method includes displaying information related to the first reservation and/or the first passenger on the display member. The method can also include paying to make the first reservation.

In accordance with another aspect of the present invention there is provided a baggage management system for a vehicle that includes a storage bin that defines a bin interior, a baggage monitoring system associated with the storage bin, and a display member associated with the storage bin. The baggage monitoring system is configured to monitor the positioning of baggage within the bin interior and the display member is configured to provide baggage positioning information to passengers. In a preferred embodiment, baggage monitoring system is configured to monitor the orientation of baggage placed in the bin interior, and the display member is configured to provide baggage orientation information. Preferably, the system is configured to provide a notification when a bag is not positioned according to the baggage positioning information. The notification is displayed on the display member. In another preferred embodiment, the system is configured to provide a notification when a bag is not positioned according to the baggage positioning information or when a bag is not oriented according to the baggage orientation information.

In a preferred embodiment, the baggage monitoring system is operably coupled to the display device (e.g., by a control module, computer, central processing unit or the like). Preferably, the storage bin includes a bucket or a door that is movable between an open and a closed position and the display member is positioned above or below the bucket or door. In a preferred embodiment, the baggage positioning information identifies a first baggage section within the bin interior and the system is configured to provide a notification when a bag is not positioned within the first baggage section.

In a preferred embodiment, the display member has a length that is approximately the same as the length of the bin interior. Preferably, the display member includes first and second demarcation lines thereon. The demarcation lines are associated with the baggage positioning information and a first baggage section is defined between the first and second demarcation lines. A second baggage section is defined between third and fourth demarcation lines. It will be appreciated that the demarcation lines may be the same line. For example, if two adjacent baggage sections are separated by a single demarcation line, for purposes of the claims, the single demarcation line may be considered two demarcation lines (e.g., it may be the second demarcation line for purposes of the first baggage section and the third demarcation line for purposes of the second baggage section).

In accordance with another aspect of the present invention there is provided a system for reserving space for a bag in a vehicle that includes a baggage monitoring system that monitors the positioning of baggage within a bin having a bin interior, a control module that is operably coupled to the baggage monitoring system, and a display member associated with the bin and operably coupled to the control module. The control module is configured to communicate baggage positioning information to the display member. The baggage positioning information is based on data received from the baggage monitoring system. And, the baggage positioning information is displayed on the display member. In a preferred embodiment, the baggage monitoring system monitors the orientation of baggage and the control module is configured to communicate baggage orientation information to the display member. The baggage orientation information is based on data received from the baggage monitoring system, and the baggage orientation information is displayed on the display member.

In accordance with another aspect of the present invention there is provided a baggage management system that includes an overhead storage bin defining a bin interior, and a display member associated with the overhead storage bin. The display member has a length that is approximately the same as a length of the bin interior. The display member is configured to display baggage positioning information that includes first and second demarcation lines that define a first baggage section, such that a passenger is informed to position a first bag between the first and second demarcation lines. In a preferred embodiment, the display member is configured to display baggage positioning information that includes third and fourth demarcation lines that define a second baggage section, such that a passenger is informed to position a second bag between the third and fourth demarcation lines. As discussed above, the second and third demarcation lines may be a single line or break between the baggage sections. Preferably, the baggage positioning information is based on baggage dimension data. As a result, the first and second baggage sections may have different lengths.

In accordance with another aspect of the present invention there is provided a method of loading baggage in a vehicle that includes providing a first storage bin having bin interior and a display member associated therewith, displaying a baggage section on the display member, and positioning a bag in the bag interior and above or below the baggage section. Preferably, the display member has a length that is approximately the same as a length of the bin interior and includes first and second demarcation lines thereon. The baggage section is defined between the first and second demarcation lines, and the step of positioning the bag in the bin interior and below the baggage section includes positioning the bag between the demarcation lines.

The present invention is a baggage management system that can be used with the overhead storage bins of commercial aircraft, such as the bins taught in U.S. Pat. No. 9,174,734, issued Nov. 3, 2015 the entirety of which is incorporated by reference herein.

In a preferred embodiment, the present invention provides passengers and crew a visual indicator of available storage space (with the bins opened or closed). The indicators are viewable for the passengers or crew while in the aisle or at their seat or at cabin level from the crew area or personal device, reducing loading time and effort by helping ensure passengers place bags near their seats, and finding those last few precious spots quickly. In a preferred embodiment, the "On" indicator is displayed with a green light (or other color) and highlights bins with available storage space. An "Off" indicator notifies a passenger or crew member of a full bin, allowing them to move to the next available "green" or not full bin. The off indicator can be a different color (e.g., red) or the "on" light can simply be off, showing that the bin is full.

In a preferred embodiment, the invention also includes the ability to collect data related to the boarding and luggage storage process. For example, the system can collect data on the number of bags stored, the orientation of the stored bag (wheels first, on edge, sideways, etc.), bag size, how much bin space is utilized, how much space is available, timing of bag storage (when bag was stored, how long from first bag stored to the last bag stored, thereby capturing "loading time"). More efficient use of the overhead bins can not only reduce boarding time, but can also make it more consistent. Data can be utilized to improve operations, turnaround time, and to fine tune the loading simulator taught in U.S. Patent App. No. 2017/0286578 (the "'578 publication"), published Oct. 5, 2017, the entirety of which is incorporated herein by reference, for precise in field performance predictions.

In a preferred embodiment the invention also includes a "smart" information strip or display member that dynamically shows a boarding passenger exactly where to put their bag (baggage positioning information) and/or in which orientation (baggage orientation information) for boarding and storage efficiency. In this embodiment, the onboard system can be combined with a bag scanner at the gate that measures bag sizes (or other method for collecting data related to passenger's bag size). The system directs the passenger to a specific bin location (preferably nearest their seat) to ensure most efficient boarding time (because bags stored at the passenger's seat minimizes the disruption of searching for baggage space, "swimming upstream" or against the flow of passengers, and slowing of other passengers) and most efficient baggage storage (bags stored efficiently help ensure the maximum number of bags can be stored, and telling the passenger where and which orientation to store the bag eliminates the need for other passengers to "reshuffle" bags later in attempt to find space). To do this, the bins include smart indicators (or a smart strip or display, as shown) which indicates to each passenger where and how (which orientation) to store their bag, effectively reserving necessary space for each passenger.

By proactively measuring bags, identifying and reserving space, the invention can reduce boarding time and passenger stress. The measurement of the bag enables the system to locate the nearest available space to that passenger's seat for their bag and also tells the passenger which orientation to load the bag for optimized space utilization and use of available space nearest to the passenger's seat. The display member associated with each bin can include passenger information such as the passenger's name, passenger's seat number or other information to indicate to the passenger where and how to place their baggage.

It will be appreciated by those of ordinary skill in the art that the amount of space reserved for a piece of baggage is dependent on the size of the bag and how it must be oriented to fit in the bin. The baggage management system uses data based on the location of the passenger's assigned seat, size of the passenger's bag (baggage dimension data) and the nearest available space within a bin to determine where to reserve the space for the passenger. In determining the reserved space, the baggage management system attempts to orient the bag in a manner that will leave the most space for additional baggage. For example, for a typical rectangular roller bag, the system has the data related to the bag's length, width and height and will reserve enough space to orient the bag so that it is placed on its side (as opposed to its back or front).

In a preferred embodiment, the system includes the ability to notify a passenger that they have positioned or oriented their bag incorrectly. The system can include audible notifications or visual notifications. For example, the display member can show the baggage icon or bag as red (or other color) if it is oriented incorrectly and green (or other color) if it is oriented correctly. Therefore, if the bag is positioned outside of the reserved space, the passenger is notified (visually or audibly) that the bag must be reoriented so that it fits within the reserved space. In a preferred embodiment, the system can also notify a passenger that they have placed their bag in the wrong position or space. This is also done based on baggage dimension data. In other words, the baggage monitoring system will know that the wrong bag is in the baggage section because it is expecting a different sized bag. For example, if passenger 17B places their bag in the space reserved for passenger 17A, even if the bag fits within the horizontal space, the system recognizes that the bag is a different sized bag than is expected in that space and provides a notification that the bag is misplaced. It will be appreciated that at different times throughout the flight (e.g., after takeoff), the display members can be used for other purposes, such as cabin lighting, mood lighting, advertising, in-flight entertainment, news and other related information, etc.

Preferably, the baggage management system indicates, for a passenger, reserved space within a specific bin and bag orientation. The reserved space and bag orientation determination are based on a plurality of baggage monitoring systems associated with each bin and baggage dimension data.

In a preferred embodiment, the airline can collect revenue by reserving space within bins for passengers. For example, a passenger seated in seat 10D can reserve space in a bin directly above their seat, thereby reducing the possibility of having to gate check their bag or place the bag in an undesirable location. The reservation can be made online at the time the original reservation is made or at a later time. The airline can charge for this ability to reserve space. In another example, a person running late can reserve space in an overhead bin while waiting in a security line (or at any other point in time prior to boarding the aircraft) to assure that they get bin space. The airline can charge a variable rate as time progresses, as the bins fill up or if a person wants to reserve more or less space.

BRIEF DESCRIPTION OF THE DRAWINGS

The invention may be more readily understood by referring to the accompanying drawings in which:

FIG. 2 is a schematic view of a bin having a baggage monitoring system associated therewith;

FIG. 3 is a perspective view of two overhead storage bins with display members thereon;

Like numerals refer to like parts throughout the several views of the drawings.

DETAILED DESCRIPTION OF THE PREFERRED EMBODIMENTS

Figure 1:
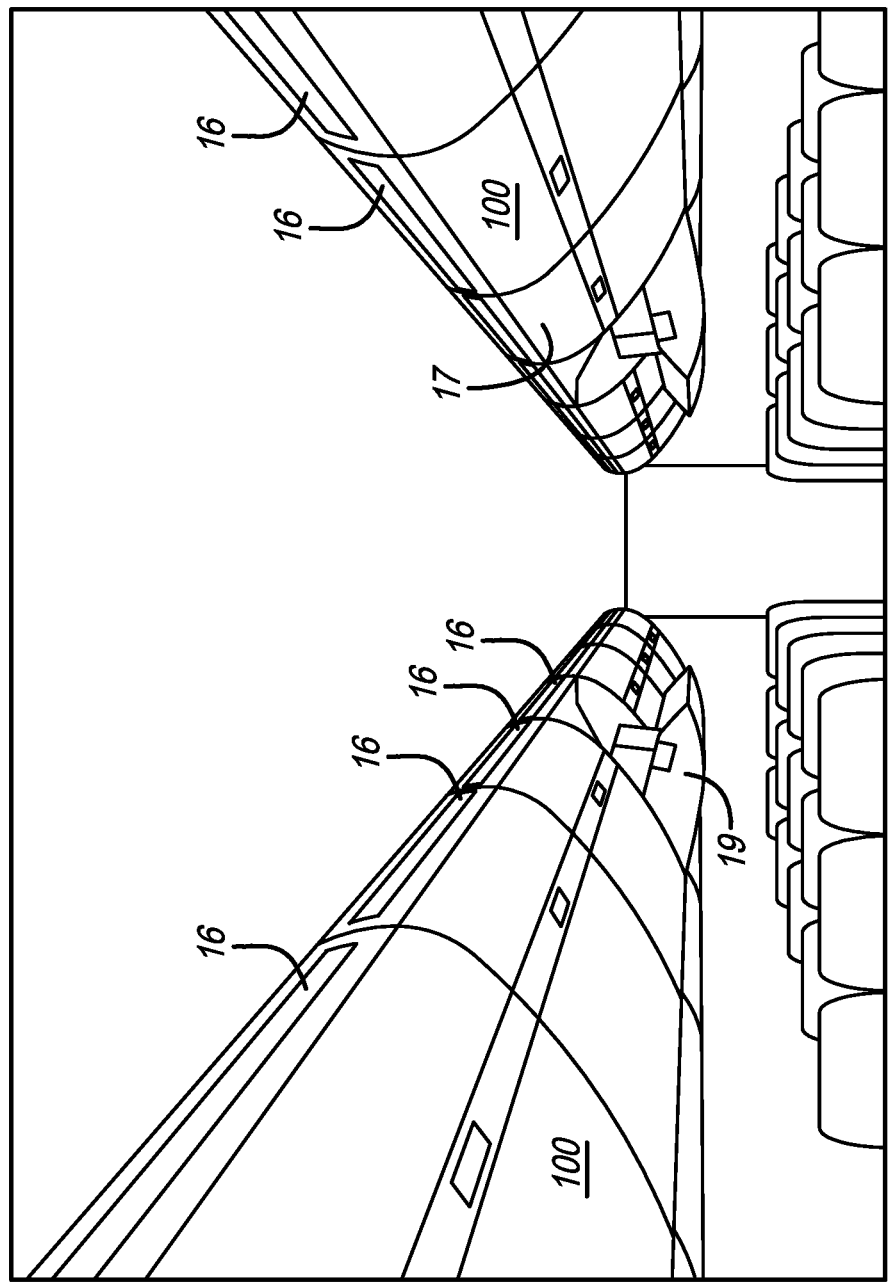
FIG. 1 is a perspective view of an aircraft cabin that includes a baggage management system therein in accordance with a preferred embodiment of the present invention.

The following description and drawings are illustrative and are not to be construed as limiting. Numerous specific details are described to provide a thorough understanding of the disclosure. However, in certain instances, well-known or conventional details are not described in order to avoid obscuring the description. References to one or another embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. Appearances of the phrase "in one embodiment" in various places in the specification do not necessarily refer to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein. Nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," and "below" used herein are merely for ease of description and refer to the orientation of the components as shown in the figures. It should be understood that any orientation of the components described herein is within the scope of the present invention. It will be appreciated that the use of dimensions and other numerical measurements are only exemplary and are not limiting.

Referring now to the drawings, wherein the showings are for purposes of illustrating the present invention and not for purposes of limiting the same, FIGS. 1-7C show preferred embodiments of the present invention, which is directed to a baggage management system 10. In a preferred embodiment, the baggage management system 10 is configured to reserve baggage space for individual passengers.

It will be appreciated that the storage capacity or available volume within the bin interior 12 of each bin 100 is monitored or determined by a baggage monitoring system 14 that may include a single monitoring member or array of monitoring members 15, as shown in FIG. 2. In a preferred embodiment, the baggage monitoring system 14 is also configured to determine the orientation or placement of each individual piece of baggage or luggage as it is placed or received in the bin interior 12. For example, the baggage monitoring system 14 can include one or more sensors, ultrasonic transducers, volumetric sensors, infrared sensors, ultrasonic range sensors, LED sensors, photo sensors, radar, lasers, cameras or the like that are mounted in or adjacent to the bins 100. The baggage monitoring system 14 can also include one or more cameras and/or one or more illuminators operating within the camera's optical spectrum. For example, the illuminators may be LEDs or lasers producing unstructured or structured light. Additional sensors include one or more distance measurement devices, laser time of flight (ToF) distance measurement devices, infrared triangulation, ultra-sonic detectors and other measuring devices. The cameras, sensors and other measurement or monitoring devices used in the baggage monitoring system for each bin can be similar to the cameras, systems and other components used for car back-up systems and similar systems. Any of the methods, devices or systems taught in the prior art U.S. patents and patent applications incorporated by reference herein for determining storage capacity, where to place bags, how to position or orient bags, etc. are within the scope of the present invention. In a preferred embodiment, the baggage monitoring system 14 includes monitoring members 15 that are one or more cameras. In a preferred embodiment, the cameras 15 are configured to determine both the available volume or capacity within the bin interior 12 and the orientation and positioning of each piece of baggage 102 within the bin 100.

As shown in FIGS. 1-3, the baggage management system also includes a plurality of display members 16 that are associated with each bin 100. The display members 16 are preferably in communication with the baggage monitoring system 14 via a computer, central processing unit or other computing device. The system may include a microcontroller or other computing devices to calculate the storage capacity status of the bin 100 based on raw measurement data received from the baggage monitoring system 14. The baggage monitoring system 14 communicates, via a wired and/or wireless connection, the storage capacity status of the bin and/or raw measurement data to the display member 10 associated with the bin 100.

The display member 16 is generally associated with the bin and can be positioned anywhere that it is visible to passengers. The display member 16 can be positioned on the bin, on the inside or outside of a bucket 19 or door of the bin, on the upper housing 17 of the bin, on a valence above the bin, inside the bin (e.g., on the bottom surface of the upper housing or on the inside surface of the back of the bin) on the floor, ceiling, aisle seat, a sign extending from or hanging down from the bin, ceiling or floor or the like. A projector could be used to project the information onto the bin or near the bin. In another embodiment, the inside surface of the bin or a portion thereof can comprise the display member. For example, the baggage sections 22 can be shown in different colors or in some other manner indicating the baggage positioning information and/or baggage orientation to the specified passenger. And, it can change colors if the bag is positioned or oriented incorrectly. In this embodiment, the demarcation lines can actually be in the bin interior showing the passenger exactly where to place their bag. Furthermore, the baggage icons 18 can be actual bag sized further helping to indicate where and how to position a bag. It will be appreciated that any type of bin is within the scope of the present invention. The bins can be pivot, fixed or articulating bins.

In a preferred embodiment, each display member 16 provides a digital readout, picture or other graphical display to passengers and crew of the storage status of the associated bin 100. The display member 16 can display the available volume within the bin 100 via a percentage or can show where the baggage is located within the bin (e.g., if the bin is closed). The display members 16 can be a monitor, television, digital readout, projector, LED device or any other electronic device that displays information to the passengers, crew or other persons on the aircraft.

As shown in FIG. 3, in a preferred embodiment, the baggage management system 10, via a display member 16, is configured to show or indicate to a boarding passenger one or both of where to place their baggage and how to orient their baggage. In other words, the display member 16 associated with each storage bin is configured to provide baggage positioning information for bags that are to be placed within the reserved sections within that particular bin 100. For example, as shown in FIG. 3, the display members 16 show depictions of bags (referred to herein as a "baggage icon 18") that are positioned in a depiction of the bin (referred to herein as a "bin icon 20") and shows the bags oriented on their side or back. As shown in FIGS. 2 and 3, in a preferred embodiment, the length of the display member 16 is approximately the same length as the bin interior 12. Therefore, the display member 16 can indicate exactly where to position a bag. In other words, a passenger can position their bag within the bin interior 12 directly below the indicated baggage section 22 on the display member 16 and between the demarcation lines 25 on the display member 16. The demarcation line 25 can be an actual line shown on the display or can simply be the end of the display member. It will be appreciated that the display member 16 does not have to be exactly the same length as the bin interior 16, but can be a few to several inches (e.g., 0.5" to 4.0") shorter as long as it can demarcate where a person can position their bag. In another embodiment, the length of the display member 16 can be less than the length of the bin interior 12.

Figure 4A:
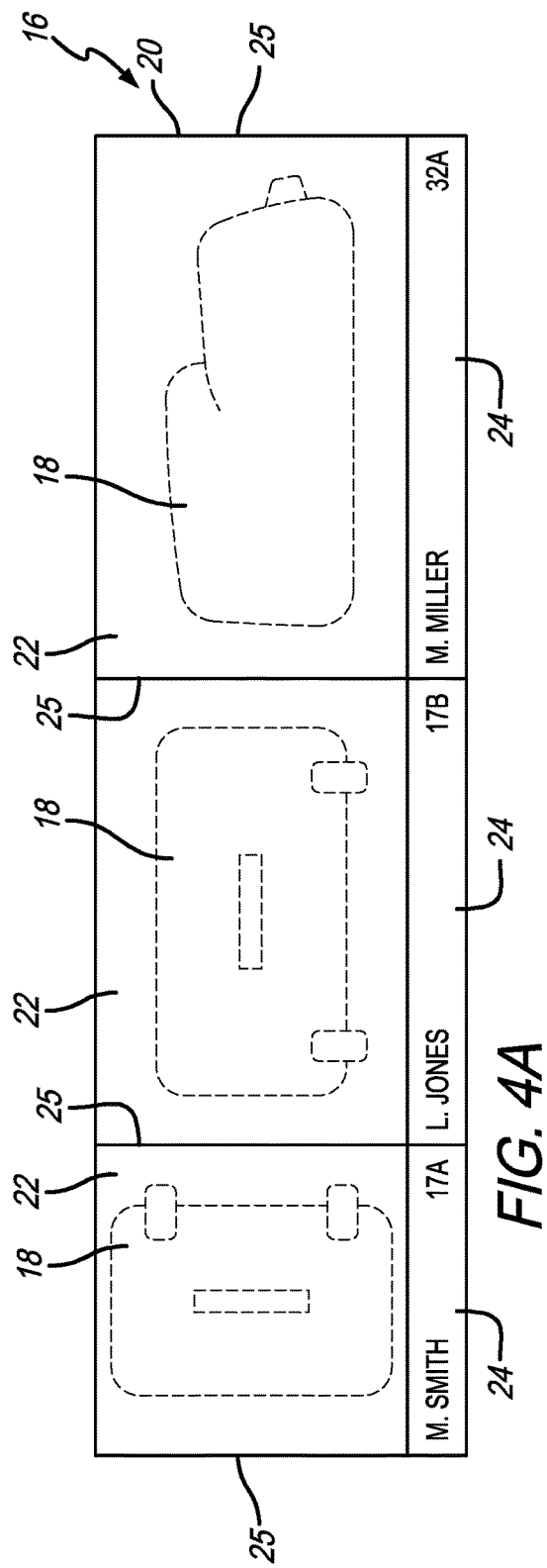
FIG. 4A is an illustration of a display member showing three storage sections for storing three bags.
Figure 4B:
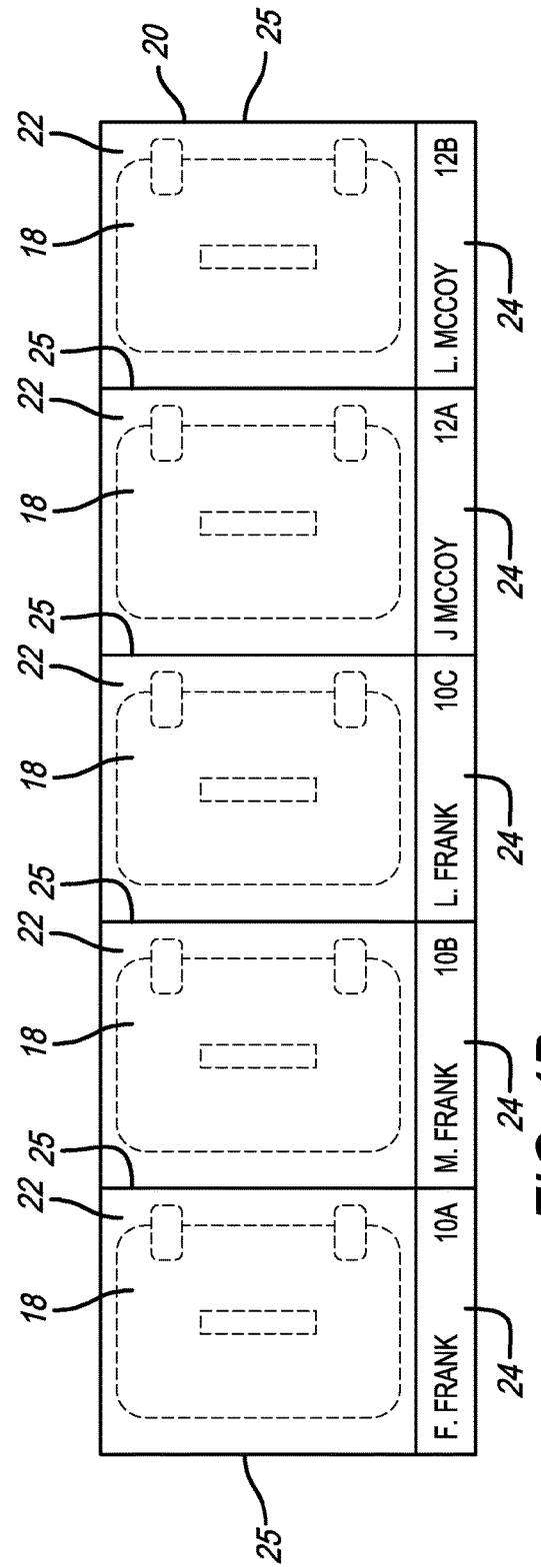
FIG. 4B is an illustration of the same display member as FIG. 4A but with five different storage sections for five bags.

With reference to FIGS. 4A-4B, it will be appreciated that the bags are also positioned within a particular baggage section 22 within the bin interior 12. As described further below, the size of the baggage sections 22 within a bin can change from flight to flight depending on the size of the bag for which the baggage section 22 is reserved. FIGS. 4A and 4B depict the same display member 16 prior to any bags being placed in the associated bin for two different flights. In FIG. 4A the bin interior has been divided into three different baggage sections 22 (via demarcation lines 25). The bin monitoring system 14 has determined that passenger M. Smith who is seated in seat 17A should position his bag on its side in the left baggage section 22, passenger L. Jones should position her larger bag on its back in the middle baggage section 22 and passenger M. Miller should position his backpack sideways in the right baggage section 22.

In use, when a passenger places their bag within the reserved or assigned baggage section, the baggage icon 18 changes from a first state to a second state to indicate that the baggage is now positioned in the baggage section 22. As discussed below, the second state may also indicate that the bag is oriented properly. In the drawings, a baggage icon 18 in dashed lines indicates an empty baggage section 22 and shows how the passenger should orient their bag. A solid line baggage icon 18 indicates that the bag has now been placed in the baggage section 22 and is oriented properly. As discussed further below, a bold dashed line baggage icon 18 indicates that the bag has been placed either in the incorrect baggage section 22 or is oriented incorrectly (see FIG. 5B).

In FIG. 3, most of the baggage icons 18 are shown in solid lines and one baggage icon 18 is shown in dashed lines. The bags associated with the solid line baggage icons 18 are all positioned in the proper baggage section and are oriented properly. As can be seen in FIG. 3, the bag associated with the dashed line baggage icon 18 is being placed in the bin interior 12, but is not all the way in (at which point the baggage icon will change to solid lines). It will be appreciated that the solid lines and dashed lines are only used for illustrative purposes. Any type of icon or depiction of the bags that indicate to a passenger where to position and how to orient their bag and that indicate when the baggage section is empty and when it is occupied is within the scope of the present invention. For example, the icons can change colors (e.g., yellow prior to being occupied, green when occupied properly and red when occupied improperly or incorrectly oriented). In another embodiment, the display member 16 can be a monitor and the baggage icon 18 can be a phantom or lighter image of a bag that then turns into an actual bag once it is positioned properly.

As shown in FIGS. 4A and 4B, the display member 16 preferably also shows reservation information 24 that identifies which passenger the baggage section 22 is reserved for. The reservation information 24 can include one or more of a name, seat number, reference number, description of the bag, dimensions of the bag or the like. In another embodiment, the display member 16 can only use text or words to indicate baggage positioning information and baggage orientation information (i.e., the baggage icons 18 can be omitted). For example, the display member 16 can state "M. Millers bag goes here positioned on its side wheels first." The bag could then be positioned below and between the demarcation lines 25 associated with the baggage section 22 that includes the information above. It should be understood that "between the demarcation lines" means between the demarcation lines if they were extended downwardly from the display member and through the bin interior. It will be appreciated that because the system is dynamic, the demarcation lines (and baggage sections) will move from flight to flight or use to use (as shown in FIGS. 4A and 4B. This is different than static stickers or the like that may be associated with a bin.

Figure 5A:
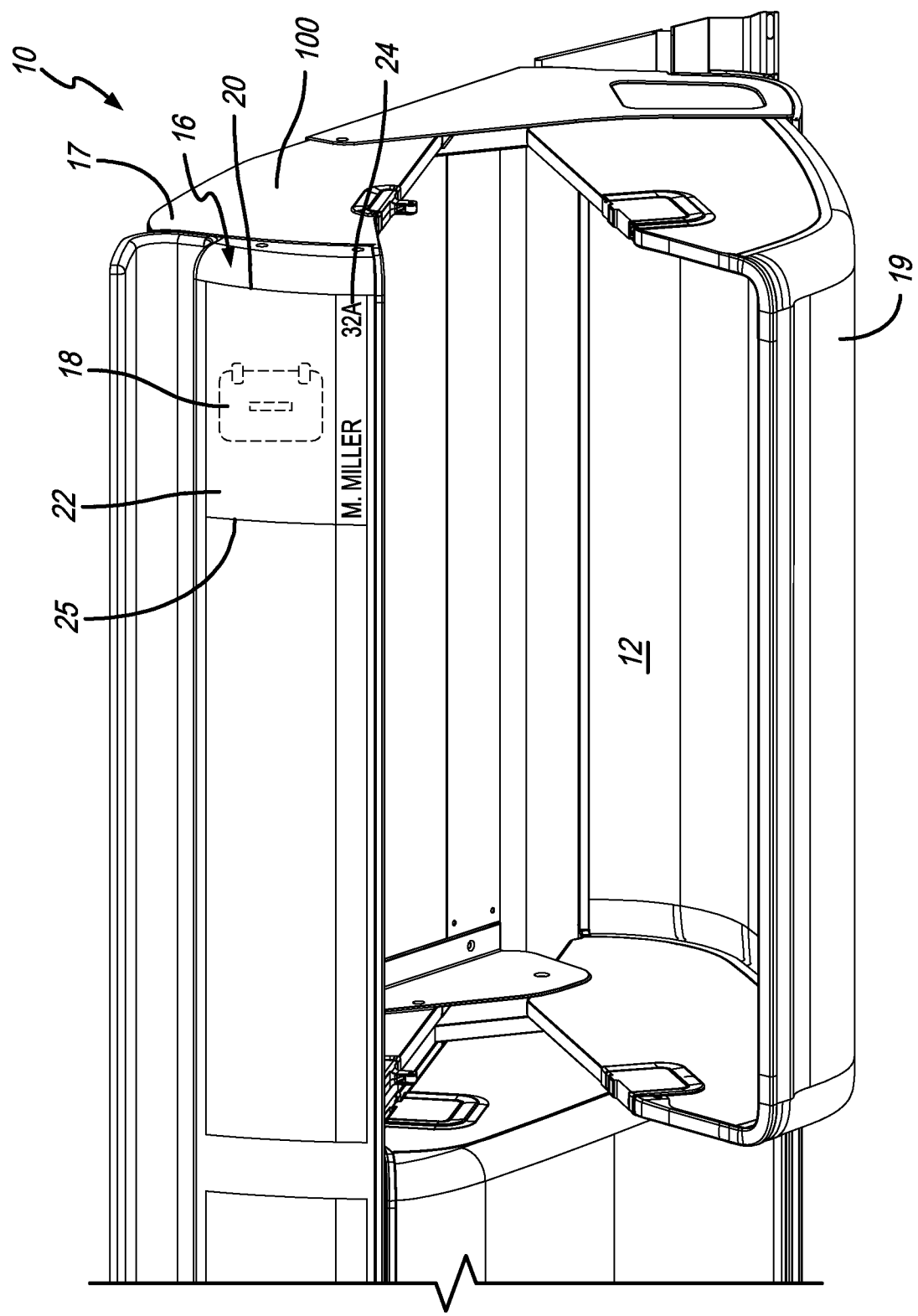
FIG. 5A is a perspective view of an empty overhead storage bin with a display member showing where a passenger seated in seat 32A should position their bag and how it should be oriented.
Figure 5B:
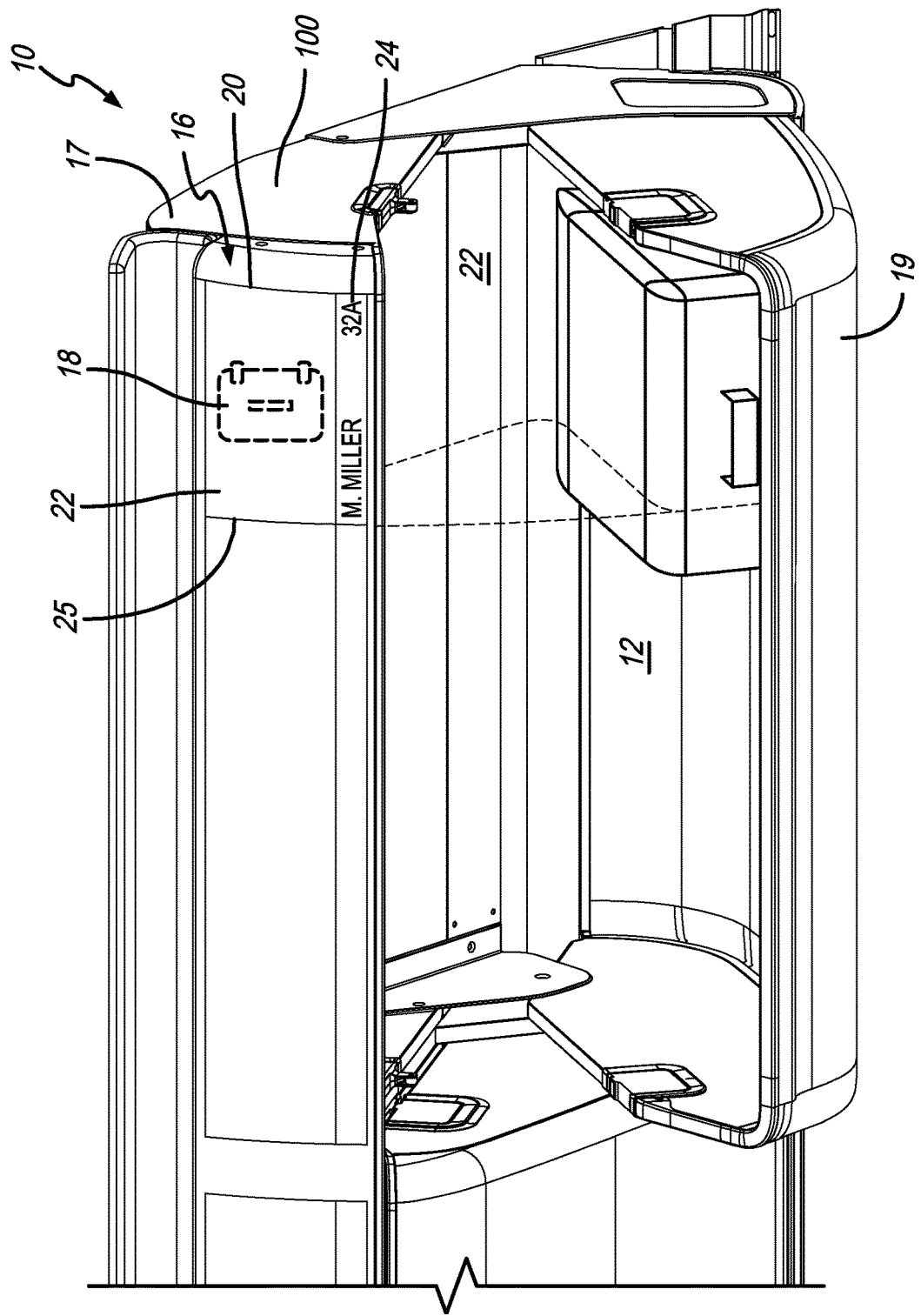
FIG. 5B is a perspective view of the overhead storage bin of FIG. 5A with the bag oriented incorrectly and the display member providing a notification.
Figure 5C:
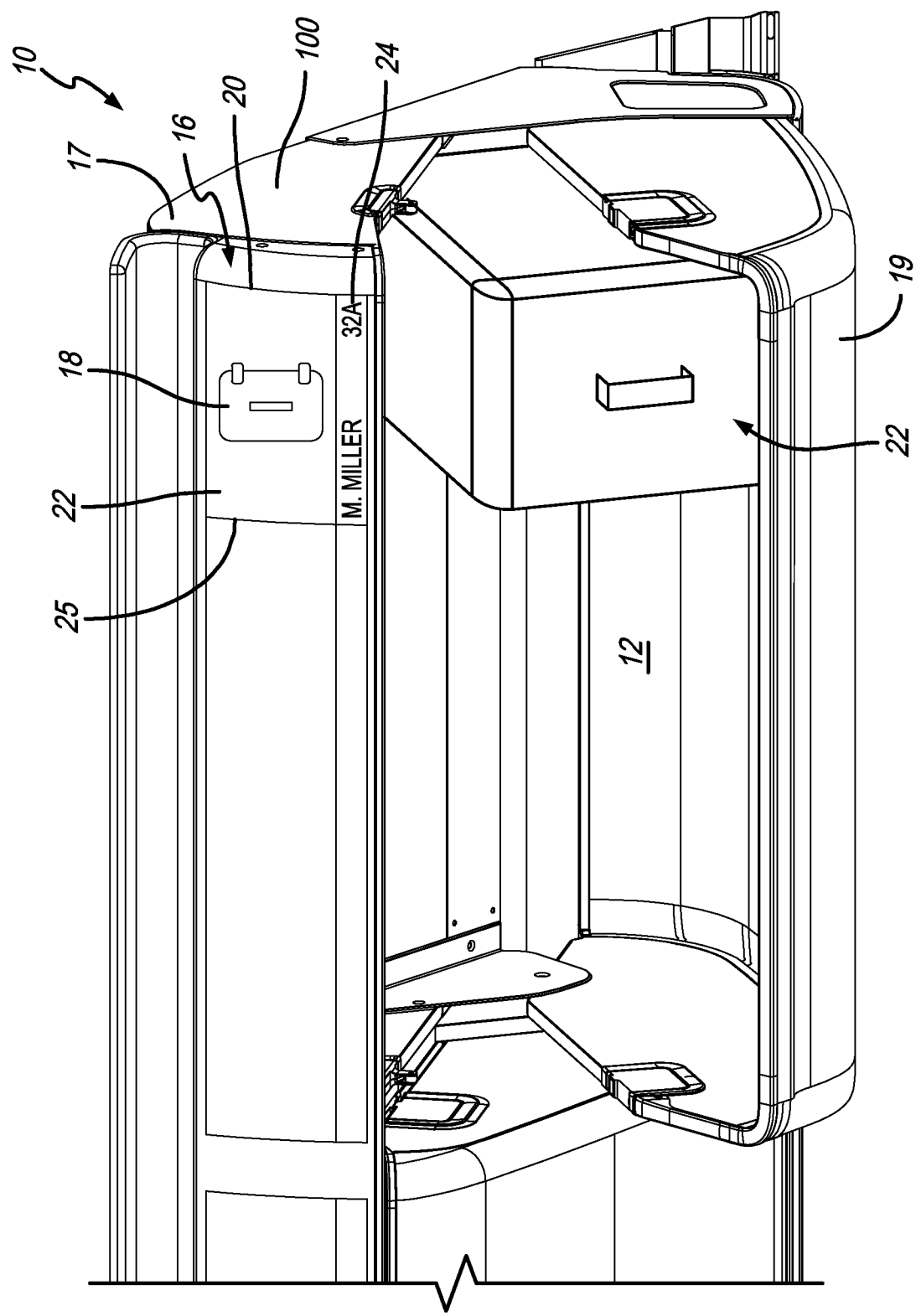
FIG. 5C is a perspective view of the overhead storage bin of FIG. 5A after the bag has been oriented correctly.

FIGS. 5A-5C show an exemplary scenario where passenger M. Miller, who is assigned seat 32A, places his bag initially in an improper orientation. FIG. 5A shows an empty bin 100 and a baggage icon 18 in dashed lines (a first state) indicating where and in what orientation (on its side) M. Miller should position his bag. As shown in FIG. 5B, M. Miller has positioned his bag on its back, which is improper (see the dashed line in the bin indicating that left boundary of the baggage section 22 where the bag is intended to be positioned). As a result, the baggage icon 18 has changed or switched to a third state and is shown in bold dashed lines. This is a visual notification to M. Miller (or other persons) that the bag is either oriented improperly or in the wrong baggage section 22. FIG. 5C shows the bag in the bin in the proper position, after M. Miller has oriented the bag on its side. The baggage icon 18 is now in solid lines (a second state) indicating that the bag is oriented properly and in the correct baggage section 22. Generally, the system is configured to provide a notification when a bag is not positioned according to the baggage positioning information provided by the baggage monitoring system 14 associated with that bin 100. In FIG. 5B, the notification is shown as bold dashed lines. Furthermore, the notification can be displayed in word form on the display member 16. The display member 16 can describe what is wrong, e.g., "the bag is positioned on its back and should be placed on its side," or "the bag is in the wrong bin," or "the bag is in the wrong baggage section of the bin" or similar notifications or messages. The notification can also be an audible notification, such as a beep, buzz or voice that describes the proper placement of orientation. The notification can be both visual and audible.

Figure 6:
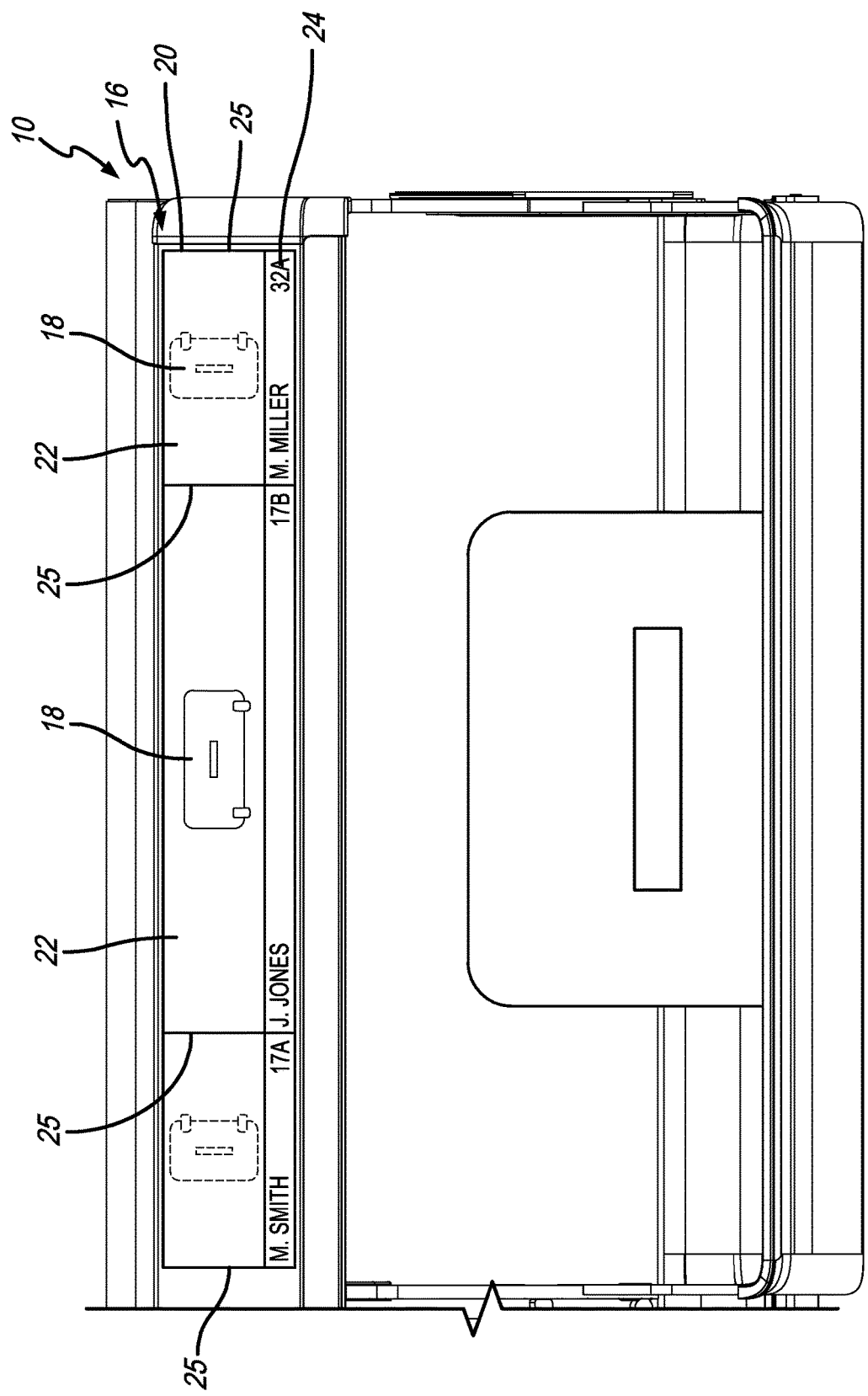
FIG. 6 is a front elevational view of an overhead storage bin with a bag positioned and oriented properly therein.

FIG. 6 shows a straight on elevational view of an overhead storage bin 100 (similar to what a passenger would see) with a bag positioned within a baggage section 22a in the bin interior 12. The display member 16 spans the length of the bin and provides first and second demarcation lines that define a first baggage section 22. The demarcation lines 25 extended downwardly define baggage section 22a within the bin interior, therefore showing the passenger where to position their bag. The other baggage icons 18 within the other baggage sections 22 are dashed because the passengers with those reserved baggage sections have not put their bags in the bin yet.

It will be appreciated that each baggage section 22 can be a volume within the bin or an area of the bin bottom surface on which the bags are placed. If a volume is used, baggage sections 22 can be positioned on top of one another, for example, to position a jacket on top of a bag. Also, if space is not reserved within a bin it can simply state "Available." For example, in FIG. 5C, the unused space next to M. Miller's bag section can say "Available" or the like on the display member 16.

In a preferred embodiment, the baggage management system 10 includes receiving or collecting information related to the size or dimensions of the baggage or luggage that is being brought onto or will be brought onto the aircraft (referred to herein as "baggage dimension data"). The baggage dimension data can be communicated to the baggage management system 10 in a number of different ways. For example, a passenger can manually measure their baggage and enter the information via their home computer or personal electronic device over the interne or other wide or local area data network. The baggage management system 10 can have baggage dimension data stored in a database based on the manufacturer or brand of bag or based on prior information entered by the passenger or airline personnel related to a specific passenger's baggage. In a preferred embodiment, the system can include a bag scanner and/or camera (similar to the baggage monitoring system embodiments described herein) that, at the gate or other position prior to the passenger arriving at their assigned seat, measures or determines bag sizes. For example, when a passenger checks in at the gate, the gate agent can scan the bag to enter the length, width, thickness, height or other dimensions into the system. The baggage management system can then determine the most efficient position and orientation of the bag based on the other baggage that has already been entered into the system. The baggage positioning and orientation information is then displayed on the display member 16 associated with the bin where the system has determined the bag should be stored or placed. Therefore, from the moment the first passenger boards and as passengers continue to board the aircraft and the bins are filled, the system directs later boarding passengers to a specific bin location nearest their seat to ensure most efficient boarding time and most efficient baggage storage. The system also knows the dimensions, volume, etc. of the bin, which will be part of determining where to optimally position a bag. For example, the system taught in the '578 publication can be utilized to optimally determine where to position a specific bag.

Figure 7:
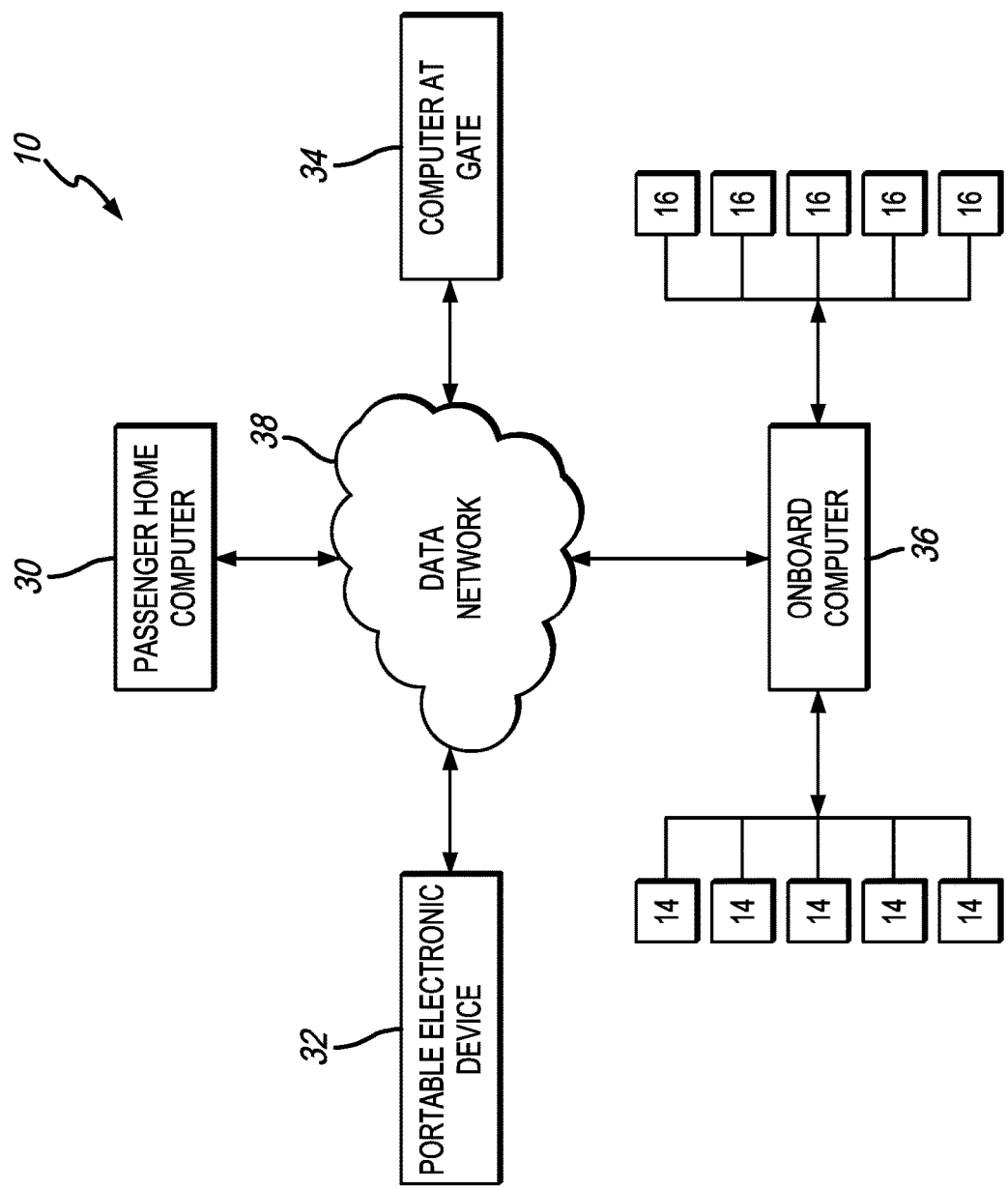
FIG. 7 is a schematic diagram showing the baggage management system.

FIG. 7 shows an exemplary schematic diagram of the system 10 and the communication between the components onboard the aircraft and various other computers that can be used to enter bag dimension data, reserve baggage space or sections, etc. For example, any pertinent information discussed herein can be entered via a passenger home computer 30, a personal electronic device 32 (of a passenger or crew member), via a computer at the gate (or at check in) 34 or the like, which are all in communication with one another and with any computer or the like on the aircraft or other vehicle (onboard computer 36) via wired or wireless connection on a local area data network or wide area data network (data network 38). The information from the baggage monitoring systems 14 is communicated to the control module or onboard computer 36 and the baggage positioning information and baggage orientation information is communicated to and displayed on the display members 16. In a simplified embodiment of the invention, the orientation information can be omitted and only the positioning information (i.e., which baggage section) can be included. In other words, a space or section can be reserved for the passenger, but it does not matter how they orient their bag therein. The baggage sections can be automatically reserved for passengers or the passengers can reserve their own baggage section. In another embodiment of the invention, the baggage monitoring system can be omitted. In this embodiment, the system can determine baggage space based on bag dimension information and data and then display the baggage sections on the display members. This embodiment preferably includes display members that are approximately the same length as the length of the bin interior. However, the system does not have a way of indicating that a bag is positioned or oriented improperly. This would have to be monitored by the flight staff and/or passengers.

Figure 8C:
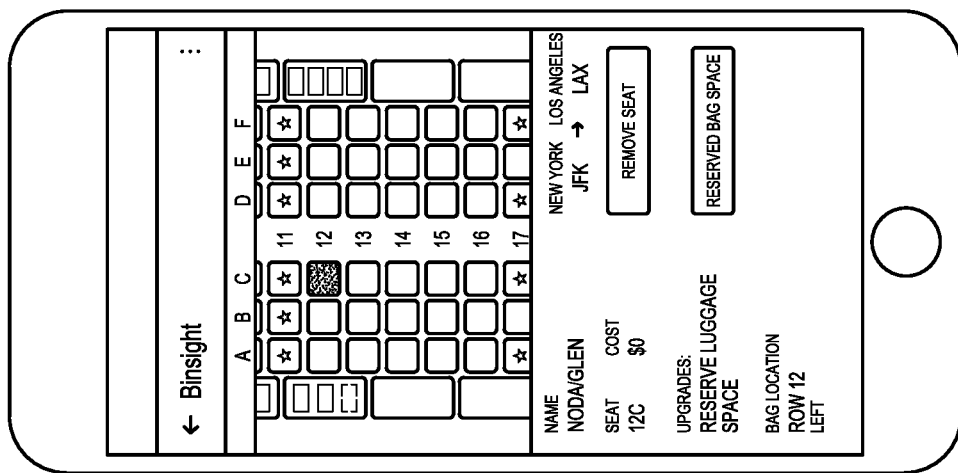
FIGS. 8A-8C are illustrations of a personal electronic device having an application thereon for paying for and reserving bag space.
Figure 8B:
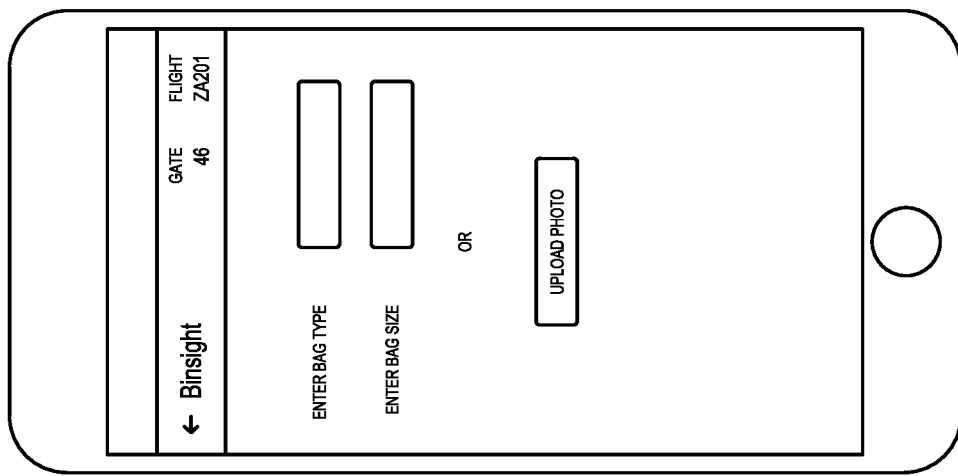
Figure 8A:
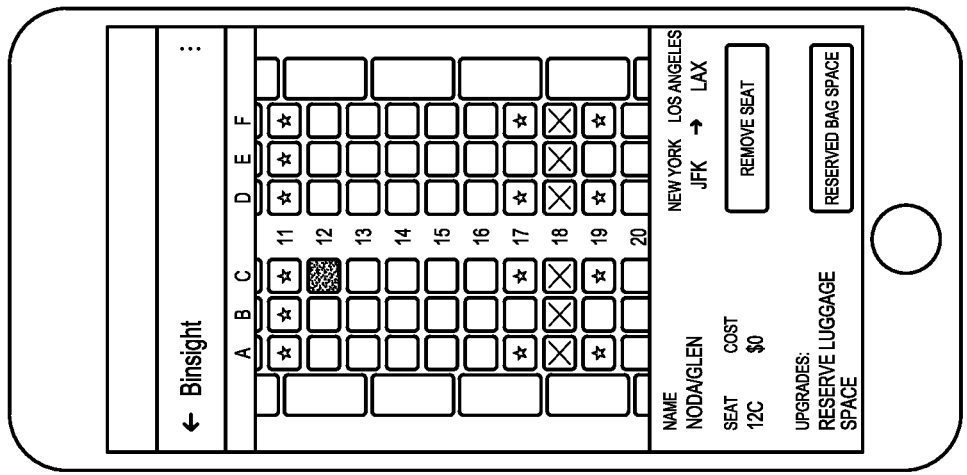

FIGS. 8A-8C show exemplary screen grabs of a system where a passenger can reserve and pay for their own space or baggage section while making their initial flight reservation. It will be appreciated that the baggage section reservation can also be made after the initial reservation and any time up until take off. FIG. 8A shows passenger Glen Noda reserving seat 12C for their reservation on a personal electronic device. The screen also prompts the passenger to "reserve luggage space." After the passenger chooses the option of reserving bag space they have to communicate to the system the dimensions or size of their bag. FIG. 8B shows an exemplary screen shot where bag information can be entered. For example, the passenger can enter the type of bag, and, if the system already includes bag dimension information in the database the passenger does not need to actually enter the information. Another option is for the passenger to enter the bag dimension information. Another option is for the passenger to upload a picture of the bag and the system can determine the bag dimensions based on the picture (e.g., using technology discussed above). Once the bag dimension information is determined, the system determines the optimal placement of the bag and provides a reserved a baggage section. FIG. 8C shows that there are already two bags in the closest bin to seat 12C and therefore a baggage section is reserved to the left side (when facing the bin) of the bin closest to seat 12C (see the bag shown in dashed lines). The passenger may have the option of reserving a different baggage section if they do not like the one provided. This system can provide the ability for airlines to charge for bin space or sections when reserved in advance. Furthermore, the price can go up as flight time nears.

An exemplary method for reserving space can include first inputting bag size, which can include physical measurement of the bag, measurement via a photograph or entry of bag type, for example. The bag dimension data can be stored in a passenger's profile for later use. Next, the system determines how to orient the bag most efficiently (see the '578 publication), e.g., on its side, on its back, lengthwise, wheels in or out, etc. Next, the system finds the nearest spot to the passenger's assigned seat (knowing bin length and available remaining space, volume, etc.). Next the passenger can be asked to reserve the space (e.g., pay for it) or not and risk not getting any bin space. Then, when the passenger eventually boards the plane the display member indicates to the passenger where to place their bag and how to orient it.

In a preferred embodiment, the system includes a computer device capable of receiving user initiated input commands, receiving data from the bin monitoring systems and/or the display members 16, processing data, and outputting results for communication to the system users on the display members 16 or other displays or electronic devices (can be any discussed herein). The system can include RAM (memory), a hard disk, a network, a central processing unit (CPU), mouse, keyboard, video display, and a server. It will be understood and appreciated by those of skill in the art that the computer device of system 100 could be replaced with, or augmented by, any number of other computer device types or processing units, including but not limited to a desktop computer, laptop computer, mobile or tablet device, or the like. Similarly, the hard disk can be replaced with any number of computer storage devices, including flash drives, removable media storage devices (CDs, DVDs, etc.), or the like.

The data network can consist of any network type, including but not limited to a local area network (LAN), wide area network (WAN), and/or the internet. Server can include any computing device or combination thereof, including but not limited to the computing devices described herein, such as a desktop computer, laptop computer, mobile or tablet device, as well as storage devices that may be connected to the network, such as hard drives, flash drives, removable media storage devices, or the like.

The storage devices (e.g., the hard disk, server, or other devices known to persons of ordinary skill in the art), are intended to be nonvolatile, computer readable storage media to provide storage of computer-executable instructions, data structures, program modules, and other data for the computing device of the system, which are executed by CPU/processor (or the corresponding processor of such other components). The various components of the present invention, modules or steps, are stored or recorded on hard disk or other like storage devices described above, which may be accessed and utilized by the computing device of the system, the server (over the network), or any of the peripheral devices described herein, including the display members or other displays. One or more of the modules or steps of the present invention also may be stored or recorded on the server, and transmitted over the data network, to be accessed and utilized by the onboard computer device of the system, or any other computing device that may be connected to one or more of the computing devices of the system, the network, and/or the server.

Software and web or internet implementations of the present invention could be accomplished with standard programming techniques with rule based logic and other logic to accomplish the various steps of the present invention described herein. It should also be noted that the terms "component," "module," or "step," as may be used herein and in the claims, are intended to encompass implementations using one or more lines of software code, macro instructions, hardware implementations, and/or equipment for receiving manual inputs, as will be well understood and appreciated by those of ordinary skill in the art. Such software code, modules, or elements may be implemented with any programming or scripting language such as C, C++, C #, Java, Cobol, assembler, PERL, Python, PHP, or the like, or macros using Excel or other similar or related applications with various algorithms being implemented with any combination of data structures, objects, processes, routines or other programming elements.

The drawings herein and the following discussion are intended to provide a brief, general description of a suitable computing environment in which the subject matter disclosed herein may be implemented. Although not required, aspects of a system and method for sharing location information in a networked computing environment will be described in the general context of computer-executable instructions, such as program modules, being executed by a personal computer and/or computer-readable media on which such instructions are stored. Generally, program modules include routines, programs, objects, components, data structures, etc., that perform particular tasks or implement particular abstract data types. Moreover, those skilled in the art will appreciate that the invention may be practiced with other computer system configurations, including hand-held devices, cellular or mobile telephones, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed, at different times. Further any specific numbers noted herein are only examples: alternative implementations may employ differing values or ranges.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges. It will be appreciated that any dimensions given herein are only examplary and that none of the dimensions or descriptions are limiting on the present invention.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for"). Accordingly, the applicant reserves the right to add additional claims after filing the application to pursue such additional claim forms for other aspects of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. An aircraft overhead storage bin reservation system, the system comprising:
   an aircraft that includes at least a first storage bin, wherein the first storage bin defines a first bin interior, wherein the first bin interior is divided into at least first and second baggage sections, wherein the aircraft is associated with a flight date and a flight time, and
   a reservation system, wherein the reservation system is configured to provide a first passenger with a prompt, wherein the prompt is configured to reserve at least one of the first and second baggage sections prior to the flight date and the flight time.

2. The reservation system of claim 1 further comprising a baggage monitoring system associated with the first storage bin, wherein the baggage monitoring system is configured to monitor the positioning of baggage within the first and second baggage sections.

3. The reservation system of claim 2 further comprising a display member associated with the first storage bin, wherein the display member is configured to provide baggage positioning information related to the first reservation.

4. The reservation system of claim 3 wherein the baggage positioning information includes information related to the first passenger.

5. The reservation system of claim 4 wherein the information related to the first passenger includes at least one of the first passenger's name or the first passenger's seat number.

6. The reservation system of claim 4 wherein the display member includes first, second, third and fourth demarcation lines thereon, and wherein the first baggage section is defined between the first and second demarcation lines and the second baggage section is defined between the third and fourth demarcation lines.

7. The reservation system of claim 3 wherein the baggage monitoring system is configured to monitor the orientation of baggage placed in the bin interior, wherein the display member is configured to provide baggage orientation information related to the first reservation.

8. The reservation system of claim 2 wherein the system is configured to provide a notification when a bag is not positioned according to the baggage positioning information.

9. The reservation system of claim 8 wherein the notification is displayed on the display member.

10. The reservation system of claim 7 wherein the system is configured to provide a notification when a bag is not positioned according to the baggage positioning information or when a bag is not oriented according to the baggage orientation information.

11. The reservation system of claim 10 wherein the notification is displayed on the display member.

12. The reservation system of claim 6 wherein the display member has a length that is approximately the same as a length of the bin interior.

13. The reservation system of claim 1 wherein the reservation system is configured to accept payment from the first passenger for the first reservation.

14. The reservation system of claim 1 wherein the reservation system is configured to receive baggage dimension data related to the first reservation.

15. A method of loading baggage in a vehicle, the method comprising the steps of:
   (a) receiving a user-initiated input command from a first user in response to a prompt,
   b) making a first reservation in response to the user-initiated input command by reserving a first baggage section in a bin interior of a first storage bin, wherein the first reservation is associated with a first date and a first time, and
   (c) positioning a bag in the first baggage section on the first date.

16. The method of claim 15 wherein the first storage bin includes a display member associated therewith, and wherein the method further comprises displaying information related to the first passenger on the display member.

17. The method of claim 16 wherein the display member includes first and second demarcation lines thereon, and wherein the first baggage section is defined between the first and second demarcation lines.

18. The method of claim 17 wherein the display member has a length that is approximately the same as a length of the bin interior.

19. The method of claim 15 wherein step (a) includes paying to make the first reservation.

20. The method of claim 15 wherein step (a) includes entering baggage dimension data.

* * * * *